(12) United States Patent
Tang

(10) Patent No.: US 10,684,925 B2
(45) Date of Patent: Jun. 16, 2020

(54) METHOD FOR VIEW SWITCHING IN A BLOCKCHAIN NETWORK

(71) Applicant: Alibaba Group Holding Limited, George Town (KY)

(72) Inventor: Qiang Tang, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/440,782

(22) Filed: Jun. 13, 2019

(65) Prior Publication Data

US 2019/0294514 A1    Sep. 26, 2019

Related U.S. Application Data

(63) Continuation of application No. PCT/CN2018/078169, filed on Mar. 6, 2018.

(30) Foreign Application Priority Data

Mar. 10, 2017   (CN) .......................... 2017 1 0142252

(51) Int. Cl.
   *G06F 11/00*   (2006.01)
   *G06F 11/20*   (2006.01)
   (Continued)

(52) U.S. Cl.
   CPC ...... *G06F 11/2033* (2013.01); *G06F 11/2041* (2013.01); *G06F 21/602* (2013.01);
   (Continued)

(58) Field of Classification Search
   CPC combination set(s) only.
   See application file for complete search history.

(56) References Cited

U.S. PATENT DOCUMENTS 4,569,015 A *  2/1986  Dolev ................... G06F 15/161
                                                                709/201
6,671,821 B1 * 12/2003  Castro ................... G06F 21/577
                                                                714/4.3
(Continued)

FOREIGN PATENT DOCUMENTS

CN       104679604       6/2015
CN       105488665       4/2016
(Continued)

OTHER PUBLICATIONS

PCT International Search Report and Written Opinion in International Application No. PCT/CN2018/078169, dated Jun. 5, 2018, 10 pages (with partial English translation).
(Continued)

*Primary Examiner* — Amine Riad
(74) *Attorney, Agent, or Firm* — Fish & Richardson P.C.

(57) ABSTRACT

Implementations of the present solution disclose a method for triggering view switching in a blockchain without requiring a separate consensus to be executed by the backup nodes. The blockchain primary node receives a trigger that indicates a view switching condition. Then the primary node selects a successor node, and initiates a view switch, where the successor node will act as a new primary node in the next view. The new primary node can then initiate a consensus in the next view.

18 Claims, 6 Drawing Sheets

(51) Int. Cl.
*G06F 21/60* (2013.01)
*H04L 29/06* (2006.01)

(52) U.S. Cl.
CPC .............. *H04L 63/10* (2013.01); *H04L 63/20* (2013.01); *G06F 2201/805* (2013.01); *G06F 2201/875* (2013.01)

(56) References Cited

U.S. PATENT DOCUMENTS

| | | | | |
|---|---|---|---|---|
| 8,311,991 | B2* | 11/2012 | Aggarwal | G06Q 10/087 707/654 |
| 9,501,363 | B1 | 11/2016 | Ottavio | |
| 10,049,017 | B2* | 8/2018 | Karame | G06F 11/2058 |
| 2010/0174802 | A1* | 7/2010 | Chan | G06F 16/2343 709/219 |
| 2012/0110186 | A1* | 5/2012 | Kapur | G06F 9/5072 709/226 |
| 2015/0186229 | A1 | 7/2015 | Bortnikov et al. | |
| 2017/0061398 | A1 | 3/2017 | Joseph | |
| 2019/0098080 | A1* | 3/2019 | Bermudez | H04L 67/1008 |
| 2019/0129895 | A1* | 5/2019 | Middleton | H04L 9/3239 |
| 2019/0188089 | A1* | 6/2019 | Mueller | G06F 11/1464 |

FOREIGN PATENT DOCUMENTS

| | | |
|---|---|---|
| CN | 106060036 | 10/2016 |
| CN | 106157142 | 11/2016 |
| CN | 106161495 | 11/2016 |
| CN | 106385319 | 2/2017 |
| CN | 107391320 | 11/2017 |
| RU | 2609137 | 1/2017 |
| TW | 201618004 | 5/2016 |
| WO | WO 2016170538 | 10/2016 |
| WO | WO 2017186317 | 11/2017 |

OTHER PUBLICATIONS

Crosby et al., "BlockChain Technology: Beyond Bitcoin," Sutardja Center for Entrepreneurship & Technology Technica Report, Oct. 16, 2015, 35 pages.

Nakamoto, "Bitcoin: A Peer-to-Peer Electronic Cash System," www.bitcoin.org, 2005, 9 pages.

Chuangsongme.com [online], "From Paxos to Byzantine fault tolerance, and talk about the consensus protocol of the blockchain," May 2016, retrieved on Dec. 30, 2019, retrieved from URL<https://chuansongme.com/n/348459051259>, 15 pages (with machine translation).

Extended European Search Report in European Application No. 18764913.2, dated Nov. 25, 2019, 7 pages.

\* cited by examiner

METHOD FOR VIEW SWITCHING IN A BLOCKCHAIN NETWORK

CROSS-REFERENCE TO RELATED APPLICATIONS

This application is a continuation of PCT Application No. PCT/CN2018/078169, filed on Mar. 6, 2018, which claims priority to Chinese Patent Application No. 201710142252.1, filed on Mar. 10, 2017, and each application is hereby incorporated by reference in its entirety.

TECHNICAL FIELD

The present application relates to the field of computer technologies, and in particular, to a consensus method and apparatus.

BACKGROUND

Currently, the blockchain technology is widely used, and a decentralized mode in the blockchain technology ensures that data is not easily tampered with, thereby improving security.

In practice, a blockchain network that includes multiple nodes (the nodes can be considered as devices in the blockchain network that participate in processing services) can provide corresponding services for client devices. Nodes in the blockchain network perform processing for service requests of the client devices, and feed back processing results to the client devices. In this process, processing results generated by the independently running nodes may be inconsistent. To ensure that the client device can receive a correct processing result, a consensus among the nodes is implemented by using a Practical Byzantine Fault Tolerance (PBFT) algorithm (that is, a correct processing result can be jointly acknowledged or accepted by the nodes).

In a process of using the PBFT algorithm, a consensus is usually performed in a view. In a view, one node in a blockchain network is used as a primary node (primary), and other nodes are used as backup nodes (backup). In this case, the primary node receives a service request of the client device and broadcasts the service request to all the backup nodes, and the primary node initiates a consensus. The nodes that reach the consensus perform processing for the service request and feed back a processing result to the client device.

In the existing technology, a backup node initiates view switching, and the view switching initiated by the backup node usually needs to be acknowledged or accepted by other nodes in the view. The backup node initiates a view switching request to other nodes (including the primary node) in the view, that is, initiates a consensus on the view switching request to other nodes (this consensus still uses PBFT. Different from the process of the consensus on the service request, in a consensus process based on the view switching request, each node suspends the consensus on the service request. Therefore, the consensus on the view switching request is essentially an additional consensus process). After a predetermined quantity of nodes reach a consensus, it is determined that a backup node becomes a new primary node. The new primary node broadcasts a new view message to complete view switching.

However, in the previous mechanism, an additional consensus process needs to be performed for the view switching initiated by the backup node, and the additional consensus process increases a system computation amount. In addition, in the consensus process of view switching, a consensus can be reached after being confirmed by a predetermined quantity of nodes. Finally, a new primary node broadcasts a new view message, and the entire process consumes a period of time. Apparently, an existing view switching way not only increases a computation amount of the system, but also increases time consumed for processing a service request. Consequently, relatively low processing efficiency is caused.

SUMMARY

Implementations of the present application provide a consensus method and apparatus, to alleviate a problem that a current view switching way increases a computation amount of a blockchain network and increases processing time consumption.

An implementation of the present application provides a consensus method, where the method includes the following: monitoring, by a blockchain primary node, triggering of a view switching condition; selecting, by the blockchain primary node, a successor node when the triggering of the view switching condition is monitored; and switching, by the blockchain primary node based on the successor node, a current view to a next view that uses the successor node as a succeeding blockchain primary node, so that the succeeding blockchain primary node initiates a consensus in the next view.

An implementation of the present application provides a consensus apparatus, where the apparatus includes the following: a monitoring module, configured to monitor triggering of a view switching condition; a node determining module, configured to select a successor node when the monitoring module monitors the triggering of the view switching condition; and a view switching module, configured to switch, based on the successor node, a current view to a next view that uses the successor node as a succeeding blockchain primary node, so that the succeeding blockchain primary node initiates a consensus in the next view.

The implementations of the present application provide a consensus method and apparatus. In any view, the blockchain primary node actively monitors the triggering of the view switching condition. If the view switching condition is triggered, the blockchain primary node needs to perform view switching. Further, the blockchain primary node selects a successor node from other blockchain nodes as a blockchain primary node in the next view. Accordingly, the blockchain primary node performs view switching. In the switched view, the successor node is used as a new blockchain primary node to process a service. In addition, view switching is still performed based on the previous process. Apparently, the previous view switching is initiated by the blockchain primary node. Such a way prevents the blockchain backup node from initiating the view switching consensus. In other words, an additional consensus can be prevented. As such, an additional computation amount and processing time consumption in a blockchain network can be reduced.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings.

DESCRIPTION OF IMPLEMENTATIONS

To make the objectives, technical solutions, and advantages of the present application clearer, the following clearly and comprehensively describes the technical solutions of the present application with reference to specific implementations and accompanying drawings of the present application. Apparently, the described implementations are merely some rather than all of the implementations of the present application. All other implementations obtained by a person of ordinary skill in the art based on the implementations of the present application without creative efforts shall fall within the protection scope of the present application.

As described above, in a process that nodes in a blockchain network perform a consensus by using the PBFT algorithm, once a blockchain primary node becomes faulty, a blockchain backup node initiates view switching. An additional consensus is needed for the view switching initiated by the blockchain backup node. That is, the view switching can be completed only after being acknowledged or accepted by other blockchain nodes. Apparently, an additional consensus process increases a computation amount of a blockchain network, and also increases processing time consumption.

Accordingly, an implementation of the present application provides a consensus method. For a blockchain primary node in any view, after a consensus ends, the blockchain primary node initiates view switching, to change a blockchain primary node, and no additional consensus process is needed. For ease of description, a blockchain primary node is simply referred to as a primary node, and a blockchain backup node is simply referred to as a backup node. In addition, "nodes" described below should be understood as nodes in a blockchain network that participate in a consensus.

Figure 1A:
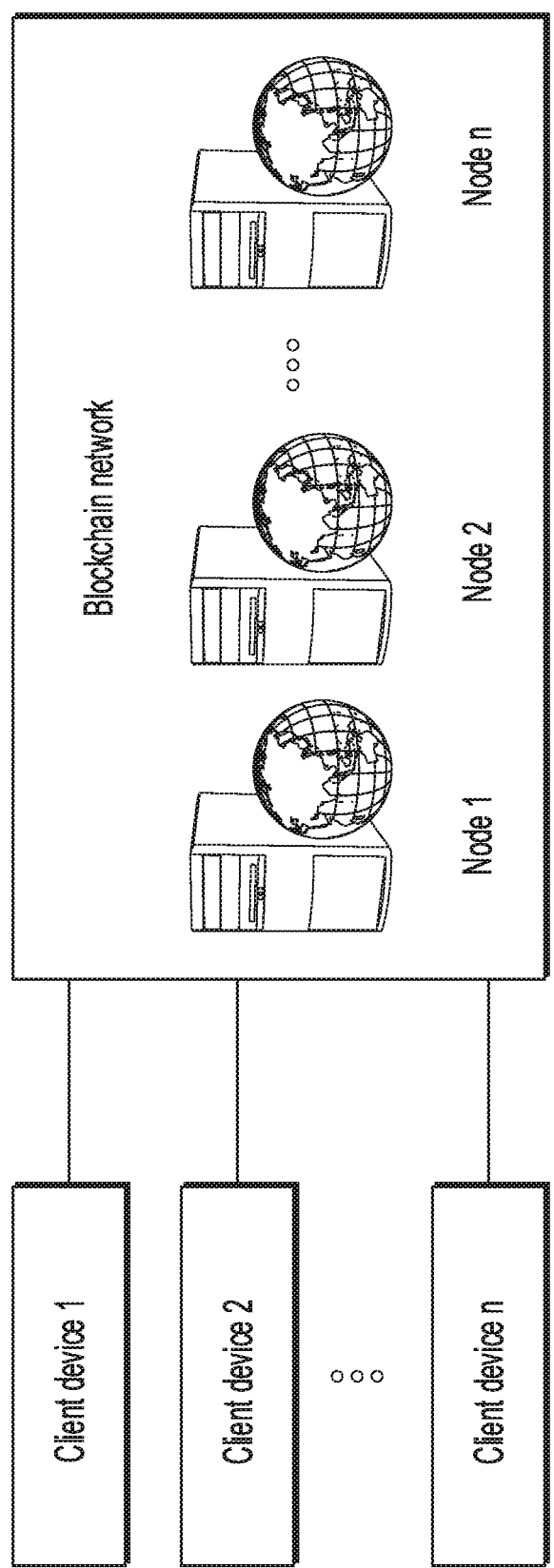
FIG. 1a illustrates an architecture that a consensus process is based on, according to an implementation of the present application.

It is worthwhile to note that, in an implementation of the present application, an architecture used in the consensus method is shown in FIG. 1a. It can be seen from FIG. 1a that a blockchain network includes multiple nodes, and multiple client devices can perform service interaction with the blockchain network. An application type of the blockchain network can be a consortium blockchain network or a private blockchain network, and the blockchain network can provide a service for a user. The node includes but is not limited to a server, a computer, a mobile device, and other devices that have a computation processing function. The client device can be configured to run a browser, an application, etc., and the client device can be an end-user device, a server, or a database. Implementations are not limited here.

Figure 1B:
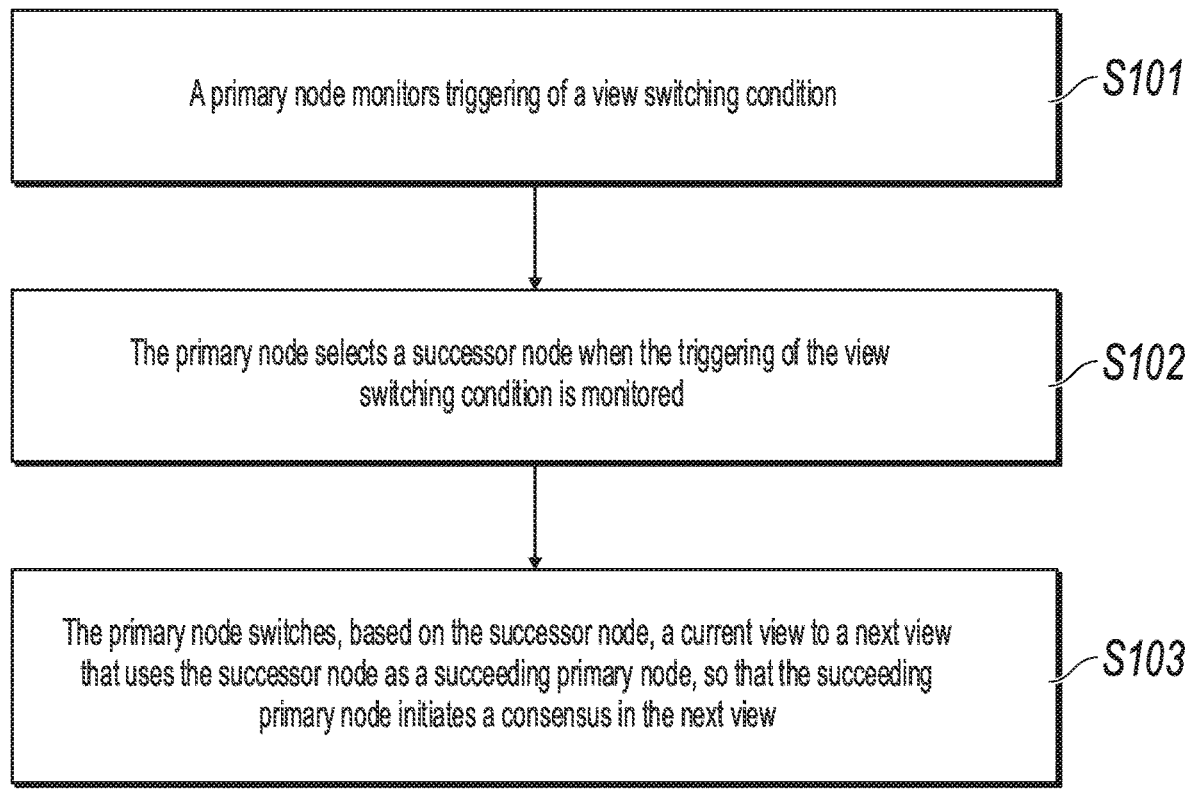
FIG. 1b illustrating a consensus process, according to an implementation of the present application.

Based on the relationship architecture shown in FIG. 1a, a consensus process provided in an implementation of the present application is shown in FIG. 1b. The process includes the following steps.

S101: A primary node monitors triggering of a view switching condition.

In this implementation of the present application, the view switching condition can be considered as a condition that needs be satisfied for performing view switching. For example, the primary node does not broadcast a service request or complete a consensus within a predetermined period of time.

In a possible way in this implementation of the present application, a timer can be set in the primary node to monitor the triggering of the view switching condition. For example, a timer can be used to time a behavior of broadcasting a service request by the primary node, to detect whether the behavior of broadcasting a service request by the primary node expires. The timer can be considered as a timing function or service that runs on the primary node, and certainly does not constitute limitations on the present application.

S102: The primary node selects a successor node when the triggering of the view switching condition is monitored.

If the view switching condition is triggered, the primary node needs to perform view switching. It is worthwhile to note that, in any view, there is only one primary node, and other nodes are backup nodes. Therefore, view switching indicates switching of the primary node. Therefore, in the present step, the primary node selects a successor node as a next primary node (the successor node in this implementation of the present application is not a same node as the primary node in the current view, that is, the primary node in the current view cannot be used as a successor node).

S103: The primary node switches, based on the successor node, a current view to a next view that uses the successor node as a succeeding primary node, so that the succeeding primary node initiates a consensus in the next view.

After the successor node is determined, the primary node performs view switching. In an existing way that a backup node initiates a view switching consensus, a process that the backup node initiates the view switching consensus can be considered as a process of "impeachment" of the primary node in the view. Different from the existing way, in this implementation of the present application, a process that the primary node independently performs view switching can be considered as a process of "active abdication", and the primary node performs the view switching without initiating a consensus. Apparently, an additional consensus process is also prevented. After view switching is performed, a newly appointed primary node is responsible for initiating a consensus in the switched view, and it can be understood that the newly appointed primary node also performs the previous view switching process. Details are omitted here for simplicity.

According to the previous steps, in any view, the primary node actively monitors the triggering of the view switching condition. If the view switching condition is triggered, the primary node needs to perform view switching. Further, the primary node selects a successor node from other nodes as a primary node in the next view. Accordingly, the primary node performs view switching. In the switched view, the successor node is used as a new primary node to process a service. In addition, view switching is still performed based on the previous process. Apparently, the previous view switching is initiated by the primary node. Such a way prevents a backup node from initiating a view switching consensus. In other words, an additional consensus can be prevented. As such, an additional computation amount and processing time consumption in a blockchain network can be reduced.

In practice, there are different view switching conditions. The following describes in detail the triggering of the view switching condition.

First Scenario:

In practice, a client device sends a service request to a primary node. In a normal status, after receiving the service request, the primary node broadcasts the service request to backup nodes in a view, to perform a consensus on the service request. However, the primary node can be an abnormal node, and does not broadcast the service request for a long time after receiving the service request. As such, the backup node initiates a view switching consensus. Therefore, to prevent a view switching consensus initiated by the backup node because the primary node does not broadcast a service request within a predetermined period of time, the primary node independently performs timing, and actively monitors an expiration phenomenon of the primary node.

In other words, in this scenario, if the view switching condition is that the primary node does not broadcast a service request within a predetermined period of time, triggering the view switching condition includes the following: receiving, by the primary node, a service request, and failing to initiate a consensus on the service request within a predetermined time.

In an actual operation, timing can be implemented by a program or a service that has a timing function in the primary node, for example, the previously mentioned timer. Timing can be started from a moment at which the primary node receives the service request. The predetermined time can be set to 5 s, 10 s, etc., can be determined based on a requirement in practice, and does not constitute limitations on the present application.

Second Scenario:

Different from the previous scenario, in this scenario, after receiving a service request, the primary node broadcasts the service request to backup nodes in a current view. In other words, the primary node has initiated a consensus on the service request before the predetermined time expires. Correspondingly, nodes in the view perform a consensus on the service request, and generate a consensus result.

It is worthwhile to note that, here, based on an existing view switching mechanism, if a consensus result is that a consensus fails, the backup node initiates a view switching consensus. Apparently, that a consensus fails can be considered as a view switching condition. In other words, in this scenario, when the consensus fails, the primary node actively performs view switching, to prevent the backup node from initiating an additional view switching consensus.

In addition, based on the existing view switching mechanism, if a consensus result is that a consensus is reached, the primary node continues to initiate a consensus on another service request. However, the primary node may be faulty in a subsequent running process. Once the primary node becomes faulty, the backup node still initiates a view switching consensus. Therefore, to prevent this case, in this implementation of the present application, after a consensus is reached, the primary node still performs view switching.

It can be seen that, in this scenario, regardless of whether the consensus result is that a consensus is reached or that a consensus fails, the primary node performs view switching after determining the consensus result. In other words, triggering the view switching condition includes the following: receiving, by the primary node, a service request, initiating a consensus on the service request, and determining a consensus result.

That is, in this scenario, the primary node needs to determine that a consensus has been reached or that a consensus fails. The following describes in detail how the primary node determines that a consensus has been reached or that a consensus fails.

First, it is worthwhile to note that a consensus process based on a service request is essentially a consensus process based on a three phase protocol. The three phases include a pre-prepare phase, a prepare phase, and a commit phase, and form a complete consensus process. At each phase, nodes (including both a primary node and backup nodes) send consensus messages to each other. That is, for each node in the view, entering different phases needs to be acknowledged or accepted by other nodes. Therefore, each of the three phases can be considered as a consensus process. Usually, when all nodes enter a commit phase, it can be considered that the consensus process is completed.

Figure 2:
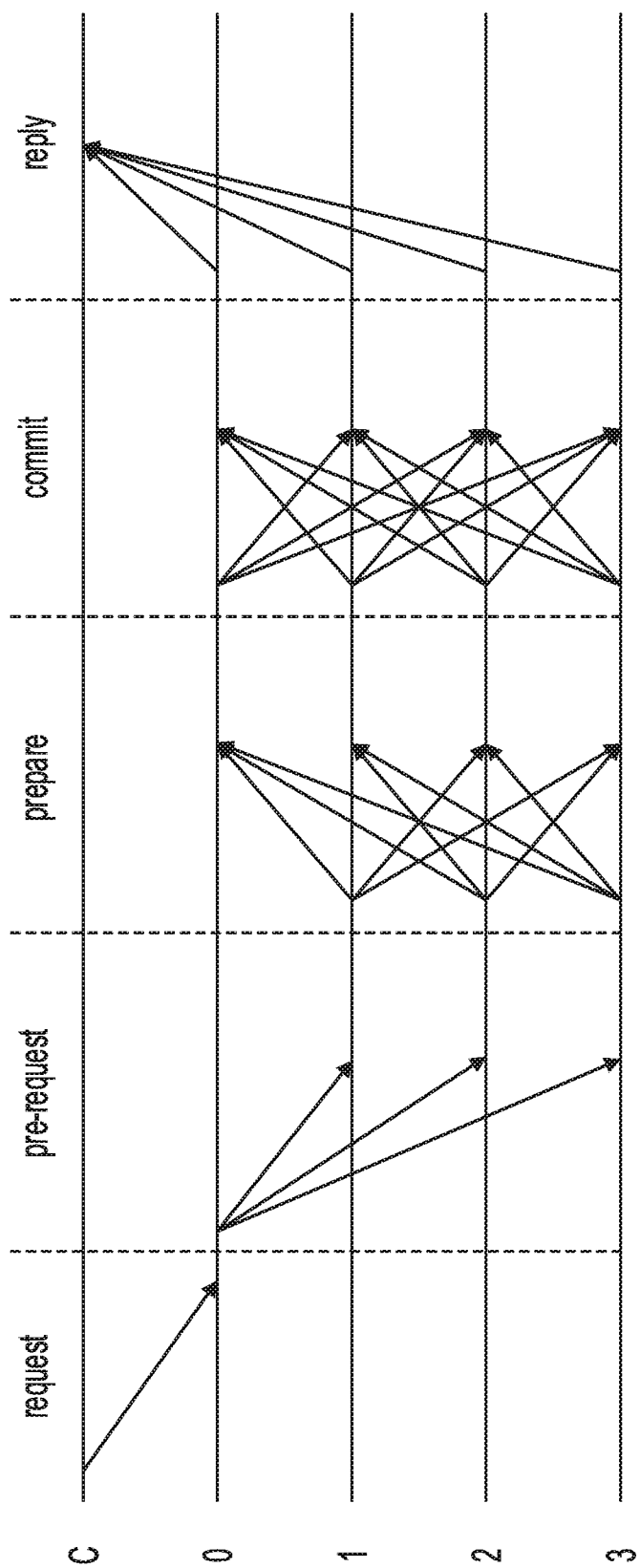
FIG. 2 is a schematic diagram illustrating a consensus process that is based on a three phase protocol in any view, according to an implementation of the present application.

FIG. 2 is a consensus process of nodes based on a three phase protocol in a view. In FIG. 2, a client device initiates a service request to a node numbered 0 (replica 0, that is, a primary node), and the primary node broadcasts the service request to backup nodes (replica 1, replica 2, and replica 3), and starts to perform a three phase consensus. The nodes that reach a consensus process the service request and feed back a processing result to the client device.

Accordingly, the following operations are performed.

1. The Primary Node Determines that a Consensus Fails.

In this implementation of the present application, that a consensus fails is represented as consensus process expiration (simply referred to as consensus expiration below, where the consensus expiration means that time consumed by a consensus process exceeds predetermined consensus duration, and the time consumed by the consensus process can be counted from a moment at which the primary node initiates the consensus). The reasons are as follows.

In one case, the primary node is a faulty node (if a node is faulty, it can be considered that data used to perform a consensus in the node is faulty or consensus logic in the node is faulty). That is, service requests sent by the primary node to backup nodes may include incorrect data (for example, an incorrect service request sequence number). Ensured by the BPFT mechanism, the backup nodes check the service requests broadcast by the primary node. Once the incorrect data is included in a service request, a normal backup node does not acknowledge or accept the service request. In this case, the primary node may repeat the process of sending service requests, and consequently, the consensus expires.

Alternatively, in another case, the primary node is also a faulty node. In this case, the primary node may send an incorrect notification message indicating a consensus phase to other backup nodes, that is, the primary node "incorrectly" considers that a certain phase has been entered. In this case, backup nodes perform a consensus on the notification message of the primary node, to confirm the authenticity of the notification message of the primary node. Similarly, a normal backup node still does not acknowledge or accept a notification message sent by the primary node. In this case, the primary node may repeat a process of sending an incorrect notification message, and consequently, the consensus expires.

Certainly, the previous content is only two possible cases that may lead to consensus expiration in practice, and should not be considered as limitations on the present application.

Apparently, it can be seen from the previous content that, once a consensus expires, the consensus fails.

Therefore, in this implementation of the present application, the primary node can detect whether a consensus fails by monitoring an overall time consuming way of a consensus process. Once the consensus process expires, the primary node immediately initiates a view switching operation, and an additional consensus process of view switching initiated by a backup node can be prevented. That is, in this implementation of the present application, a process that the primary node determines that the consensus fails can be as follows: The primary node monitors time consumed by a consensus process from a moment at which a consensus on the service request is initiated among the backup nodes in the view, and determines that the consensus fails when it is detected that the time consumed by the consensus exceeds a predetermined time.

2. The Primary Node Determines that a Consensus is Reached.

It can be seen from the previous three phase protocol that if a node enters a commit phase, the node can process a service request, and feed back a generated processing result to a client device. In addition, to enter a phase, each node needs to be acknowledged or accepted by other nodes in a view. Therefore, if a node enters a commit phase, it indicates that the node is acknowledged or accepted by other nodes. It can be seen that, if the primary node enters the commit phase, it indicates that the consensus has been reached. This is because in the PBFT mechanism, if a node enters a phase, it indicates that the status of the node is acknowledged or accepted by most nodes in the view. Accordingly, it indicates that most nodes are correct nodes.

Therefore, in such a way, a process that the primary node determines that a consensus is reached can be as follows: The primary node monitors a corresponding phase of the primary node, and when the primary node detects that the primary node enters a commit phase and predetermined consensus duration does not expire, determines that the consensus is completed. That is, when confirming that the primary node enters the commit phase, the primary node further needs to ensure that time consumed by the primary node to enter the commit phase does not exceed the predetermined time.

In another way in this implementation of the present application, the primary node may not send a notification message to other nodes (that is, the primary node may be a faulty node). However, the primary node can still receive a notification message sent by a backup node. In this case, if a predetermined quantity of nodes enter a commit phase, it can be considered that the consensus is completed.

In practice, after a node enters a commit phase, the node usually sends notification messages to other nodes in the view, where the notification message can be, for example, <commit, v, n, D(m)>, where "commit" indicates that the node has entered a commit phase, "v" indicates a view number, "n" indicates a sequence number of a service request, and "D(m)" indicates a signature performed on the service request by the node that sends the notification message.

The primary node can collect statistics about notification messages that are received by the primary node and that indicate that a commit phase is entered. If a quantity of received notification messages is greater than 2f+1, it indicates that enough nodes reach a consensus. Then, it indicates that the consensus is completed. f is a maximum quantity of tolerable incorrect nodes in the PBFT mechanism. In this case, the primary node can determine that the consensus is completed.

Therefore, a process that the primary node determines that the consensus is reached can also be as follows: The primary node monitors a notification message that is received by the primary node and that indicates that the backup node enters a commit phase, and when the primary node detects that a quantity of received notification messages exceeds a predetermined quantity and predetermined consensus duration does not expire, determines that the consensus is completed.

After the consensus is completed, the primary node initiates view switching, to change the primary node and enter the new view.

The following describes a view switching process in this implementation of the present application.

In the PBFT mechanism, each view has a corresponding number. For example, v in the previous example represents the number of the current view. Correspondingly, each node in the blockchain network has a corresponding number. If there are a total of R nodes in the blockchain network, the numbers of the nodes are 0 to R−1, for example, replica 0, replica 1, . . . , and replica R−1. There is a relationship between a node number and a view number. If replica p is used to represent the node with the number p, the node number and a view number satisfy the following equation: p=v mod R, where v is an integer from 0 to positive infinity.

This relationship indicates that the node number p is obtained after the view number v modulo the quantity R of nodes included in a blockchain network.

In other words, because v ranges from 0 to R−1, it is ensured that the identity of the primary node is sequentially handed over to different nodes. For example, if the primary node of the current view is replica 0 (that corresponds to the view number 0), the primary node in the next view (numbered 1) is replica 1. All the nodes are traversed in this way.

Therefore, it can be seen that, in this implementation of the present application, a view switching process includes the following: determining, by the primary node, a number of the primary node; determining, based on the number of the primary node, a node whose number is arranged after the number of the primary node; generating a view switching notification message based on the determined node; and sending the view switching message to each backup node to perform view switching, so that the determined node becomes a primary node in a next view.

Figure 3:
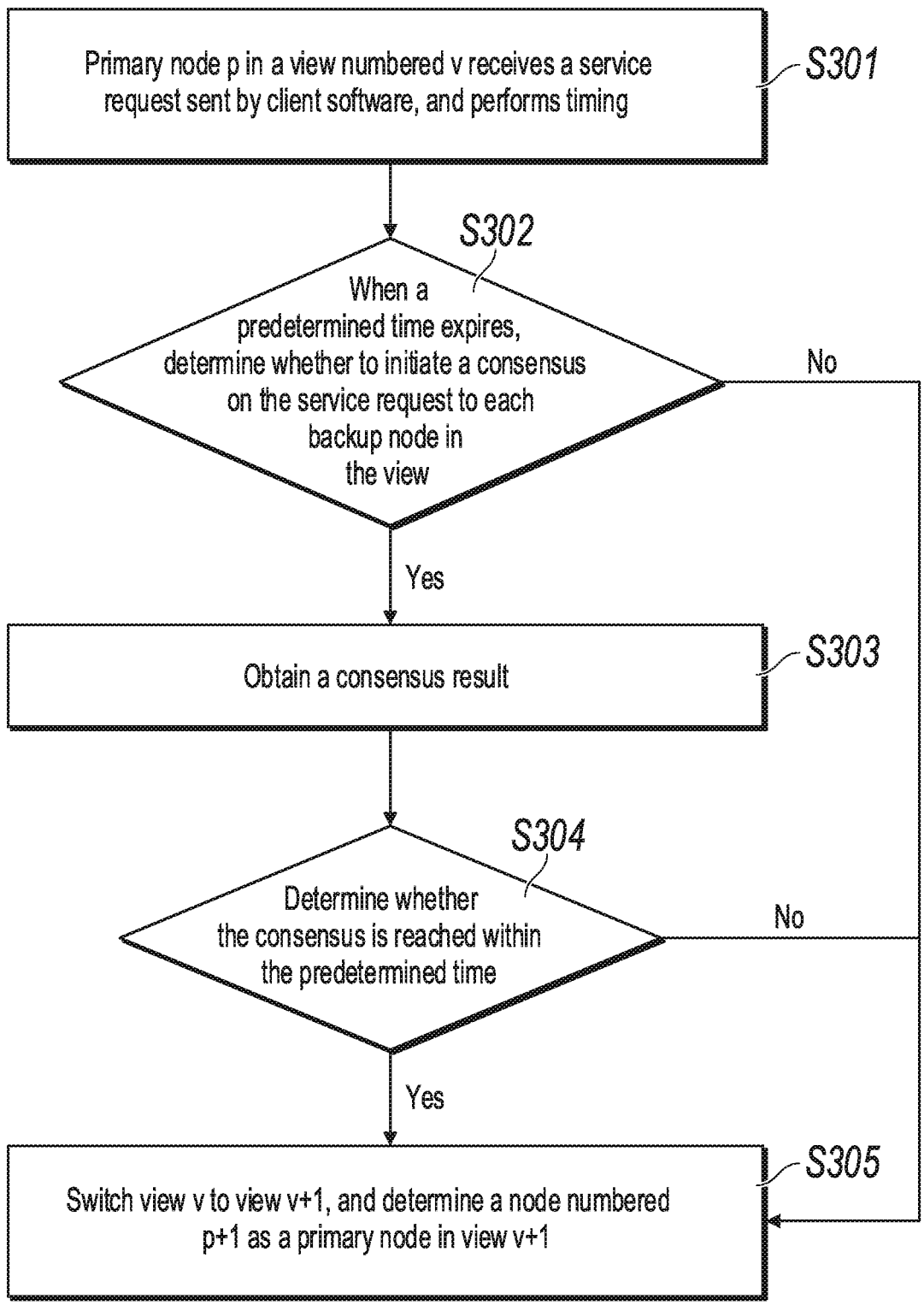
FIG. 3 is a schematic diagram illustrating an execution process of an application instance of view switching, according to an implementation of the present application.

The following uses a specific application instance for description. As shown in FIG. 3, the instance includes the following steps:

S301: Primary node p in a view numbered v receives a service request sent by a client device, and performs timing.

S302: When a predetermined time expires, determine whether to initiate a consensus on the service request to each backup node in the view; if yes, perform step S303; and otherwise, perform step S305.

S303: Obtain a consensus result.

S304: Determine whether the consensus is reached, and perform step S305.

S305: Switch view v to view v+1, and determine a node numbered p+1 as a primary node in view v+1.

The previous view switching is initiated by the primary node. Such a way prevents a backup node from initiating a view switching consensus.

Figure 4:
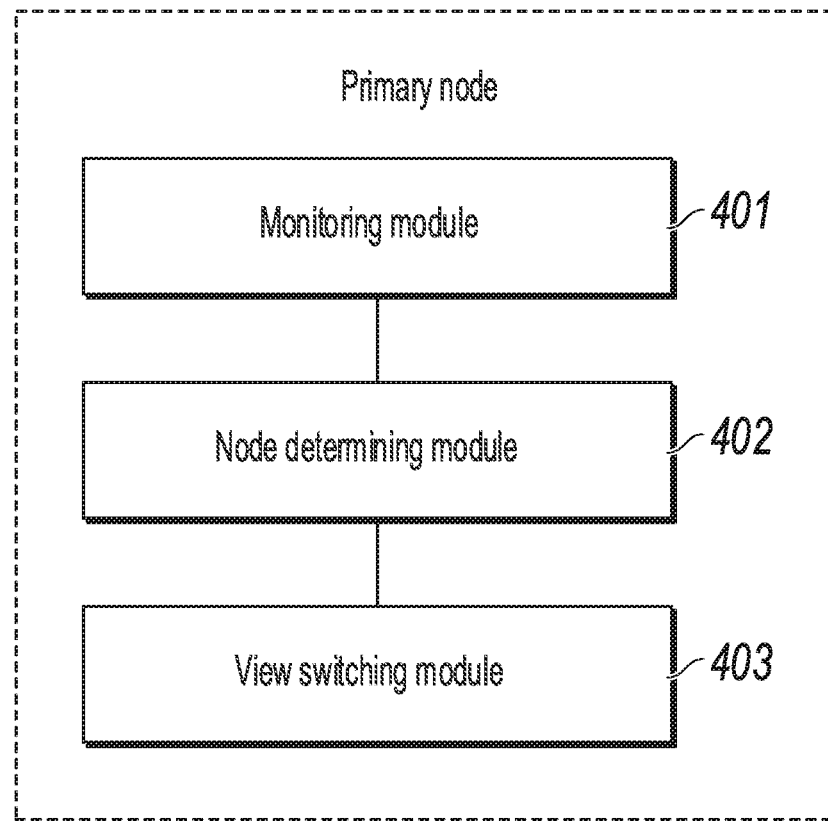
FIG. 4 is a schematic structural diagram illustrating a consensus apparatus, according to an implementation of the present application.

The above is a consensus method provided in the implementation of the present application. Based on the same idea, the implementations of the present application further provide a consensus apparatus. As shown in FIG. 4, for any view, the consensus apparatus includes the following: a monitoring module 401, configured to monitor triggering of a view switching condition; a node determining module 402, configured to select a successor node when the monitoring module monitors the triggering of the view switching condition; and a view switching module 403, configured to switch, based on the successor node, a current view to a next view that uses the successor node as a succeeding blockchain primary node, so that the succeeding blockchain primary node initiates a consensus in the next view.

In response to determining that a service request is received and a consensus on the service request is not initiated within a predetermined time, the monitoring module 401 determines that the triggering of the view switching condition is monitored.

In response to determining that a service request is received, a consensus on the service request is initiated, and a consensus result is determined, the monitoring module 401 determines that the triggering of the view switching condition is monitored.

The node determining module 402 determines a next view of the current view, and determines a successor node that corresponds to the next view.

The view switching module 403 switches the current view to the determined next view, where the successor node is used as a primary node in the next view.

A node in any view includes a node in a consortium blockchain network or a private blockchain network.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicon Labs C8051F320. The memory controller can also be implemented as a part of the control logic of the memory. A person skilled in the art also knows that, in addition to implementing the controller by using the computer-readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present application is implemented, a function of each unit can be implemented in one or more pieces of software and/or hardware.

A person skilled in the art should understand that an implementation of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer-readable memory that can instruct the computer or the another programmable data processing device to work in a specific way, so that the instructions stored in the computer-readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device. The computer storage medium can be used to store information accessible by the computing device. Based on the definition in the present specification, the computer-readable medium does not include transitory computer-readable media (transitory media) such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such a process, method, product or device. Without more constraints, an element preceded by "includes a . . . " does not preclude the existence of additional identical elements in the process, method, product or device that includes the element.

A person skilled in the art should understand that an implementation of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a disk memory, a CD-ROM, an optical memory, etc.) that include computer-usable program code.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are described in a progressive way. For same or similar parts of the implementations, references can be made to the implementations. Each implementation focuses on a difference from other implementations. Particularly, a system implementation is basically similar to a method implementation, and therefore, is described briefly. For related parts, references can be made to related descriptions in the method implementation.

The previous implementations are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

As described herein, the present solution and description relates to implementations of achieving consensus in a blockchain. When a blockchain uses the PBFT algorithm, consensus is normally performed in a view. A view is a collection of data, or a state table, that is generated throughout the consensus cycle and is led by a primary node, with all other nodes in the blockchain acting as backup nodes. When consensus is unable to be achieved, a view switch must occur, which selects a new primary node and creates a new collection of data (state table) prior to re-attempting consensus. In contrast, the present solution allows the view to be switched automatically, and efficiently, upon detection by the primary node of a triggering event.

This solution allows view switching to occur without separately determining a consensus prior to performing the view switching. Achieving consensus can be time consuming, and can require significant processing power. Therefore, it is desirable to minimize the amount of times a blockchain is required to achieve consensus. By having the primary node automatically choose a successor node and initiate a view switch, the backup nodes no longer have to achieve a separate consensus to accomplish the view switch. Therefore, the blockchain spends less time in view switching, and more time handling service request.

Figure 5:
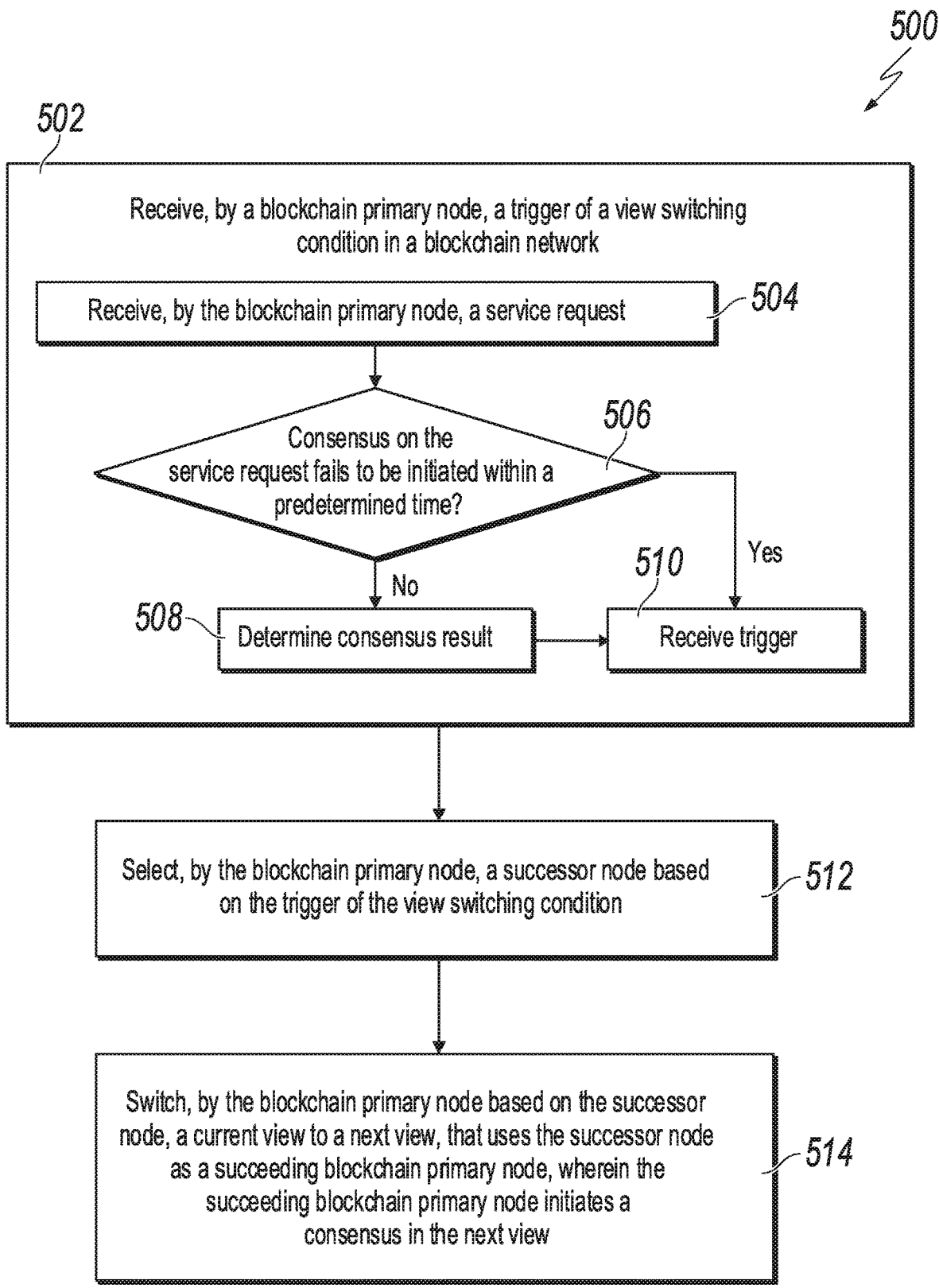
FIG. 5 is a flowchart illustrating an example of a computer-implemented method for triggering view switching, according to an implementation of the present disclosure.

FIG. 5 is a flowchart illustrating an example of a computer-implemented method 500 for triggering view switching in a blockchain, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, the blockchain primary node receives a trigger of a view switching condition in a blockchain network. The trigger indicates to the primary node that a view switching event must occur. The trigger can be, but is not limited to, a predetermined time, a failed or expired consensus, or invalid data, among others and further described below. From 502, method 500 proceeds to 504.

At 504, the blockchain primary node receives a service request. A service request is sent from a client device for processing by the blockchain. For example, a service request can include, but is not limited to, adding transactions to the blockchain or updating a smart contract in a blockchain. A client device is any device that sends a service request to the blockchain and receives processing results from the blockchain. From 504, method 500 proceeds to 506.

At 506, a determination is made whether consensus has been initiated within a predetermined time. In one implementation, the predetermined time is implemented using a program or service that has a timing function within the primary node. In such implementations, timing can be started when the primary node receives a service request, and the predetermined time is a set time from the receipt of the service request. The predetermined time can be based on an optimization for maximum blockchain performance. For example, the predetermined time can be 5 seconds, or 10 seconds, or any other suitable time.

Using the predetermined time, method 500 prevents the backup nodes from needing to achieve consensus before performing a view switch in the event the primary node fails to initiate consensus following receipt of a service request. In one instance, if the service request contains incorrect data, when the primary node sends the service request to the other nodes for consensus the backup nodes will be unable to verify the service request using the BPFT mechanism, and will not acknowledge or accept the service request. Therefore, consensus will not be initiated before the predetermined time. In another instance, if a faulty primary node initiates consensus using an incorrect notification message, or incorrectly broadcasts that the backup nodes are a certain phase of consensus, a non-faulty backup node will not respond or acknowledge the incorrect notification message. The faulty primary node will continue to attempt to initiate consensus with the incorrect notification message until the predetermined time, at which point consensus will have failed to have been initiated. If it is determined that consensus has not failed to be initiated within the predetermined time, then method 500 proceeds to 508. If it is determined that consensus fails to be initiated within the predetermined time, then method 500 proceeds to 508.

At 508, consensus is initiated. Consensus can occur in a three phase protocol. The three phases are pre-prepare, prepare, and commit. After each phase of the consensus each node sends a consensus message to every other node, and all nodes must agree before moving to the next phase. When all the nodes have entered the commit phase, consensus is considered achieved. Once consensus is achieved, the service request is processed, and the processing results can be sent to the client device. In some implementations, regardless of the result of the consensus, the primary node can then initiate view switching. From 508, method 500 proceeds to 510.

At 510 a trigger for a view switching condition is received by the blockchain primary node. The trigger can view switching can be, for example, a successful or failed consensus, failing to initiate consensus within a predetermined time, incorrect data in the service request, or incorrect data from the primary node, among other things. Once the trigger has been received, method 500 proceeds to 512.

At 512, the blockchain primary node selects a successor node based on the trigger of the view switching condition. The primary node can select a successor node from a set of backup nodes. In one implementation, the successor node cannot be the primary node, and is associated with the view number for the next view. The successor node will become the primary node once the view is switched, carrying out all of the actions of the primary node. From 512, method 500 proceeds to 514.

At 514, the blockchain primary node switches the current view to a next view that uses the successor node as a succeeding blockchain primary node, wherein the succeeding blockchain primary node initiates a consensus in the next view. In some instances, the next consensus is based on the previous service request. In another instance, the next consensus may be based on a new service request. In this manner, the system will initiate view switching regardless of the consensus result, and the need for the backup nodes to achieve a separate consensus to "impeach" the primary node in the event of a fault is negated or removed. In the present solution, the primary node will "abdicate" following a determination of consensus, or if the blockchain fails to reach consensus before a predetermined time. After 514, method 500 stops.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for performing view switching in a blockchain network, wherein the blockchain network comprises a primary node and a plurality of backup nodes, wherein the primary node initiates a consensus for a service request within the blockchain network, and wherein the service request is not for initiating a view switching, the method comprising:

receiving, by the blockchain primary node, a trigger of a view switching condition in a blockchain network, wherein the trigger indicates one of:
  (a) receiving the service request, initiating the consensus for the service request, and determining a result of the consensus for the service request, or
  (b) a failure to initiate the consensus for the service request within a predetermined time;

selecting, by the blockchain primary node, a successor node from the plurality of backup nodes based on the trigger of the view switching condition; and switching, by the blockchain primary node based on the successor node, a current view to a next view that uses the successor node as a succeeding blockchain primary node, wherein the succeeding blockchain primary node initiates a consensus in the next view.

2. The computer-implemented method of claim 1, wherein receiving the trigger of the view switching condition comprises:
receiving, by the blockchain primary node, a service request; and
determining that a consensus on the service request fails to be initiated within a predetermined time.

3. The computer-implemented method of claim 2, wherein determining that the consensus on the service request fails to be initiated with the predetermined time comprises:
determining that data included in the service request is incorrect.

4. The computer-implemented method of claim 2, wherein determining that the consensus on the service request fails to be initiated with the predetermined time comprises:
determining that the blockchain primary node sent an incorrect notification message indicating a consensus phase to the successor node.

5. The computer-implemented method of claim 1, wherein selecting, by the blockchain primary node, the successor node comprises:
determining, by the blockchain primary node, a next view of the current view; and
selecting a successor node that corresponds to the next view.

6. The computer-implemented method of claim 5, wherein switching the current view to the next view that uses the successor node as the succeeding blockchain primary node comprises:
switching the current view to the next view, wherein the successor node is used as a blockchain primary node in the next view.

7. The computer-implemented method of claim 1, wherein the blockchain network comprises a consortium blockchain network or a private blockchain network.

8. A non-transitory, computer-readable medium storing one or more instructions executable by a computer system to perform operations for performing view switching in a blockchain network, wherein the blockchain network comprises a primary node and a plurality of backup nodes, wherein the primary node initiates a consensus for a service request within the blockchain network, and wherein the service request is not for initiating a view switching, the method comprising:
receiving, by the blockchain primary node, a trigger of a view switching condition in a blockchain network, wherein the trigger indicates one of:
(a) receiving the service request, initiating the consensus for the service request, and determining a result of the consensus for the service request, or
(b) a failure to initiate the consensus for the service request within a predetermined time;
selecting, by the blockchain primary node, a successor node from the plurality of backup nodes based on the trigger of the view switching condition; and
switching, by the blockchain primary node based on the successor node, a current view to a next view that uses the successor node as a succeeding blockchain primary node, wherein the succeeding blockchain primary node initiates a consensus in the next view.

9. The computer-readable medium of claim 8, wherein receiving the trigger of the view switching condition comprises:
receiving, by the blockchain primary node, a service request; and
determining that a consensus on the service request fails to be initiated within a predetermined time.

10. The computer-readable medium of claim 9, wherein determining that the consensus on the service request fails to be initiated with the predetermined time comprises:
determining that data included in the service request is incorrect.

11. The computer-readable medium of claim 9, wherein determining that the consensus on the service request fails to be initiated with the predetermined time comprises:
determining that the blockchain primary node sent an incorrect notification message indicating a consensus phase to the successor node.

12. The computer-readable medium of claim 8, wherein selecting, by the blockchain primary node, the successor node comprises:
determining, by the blockchain primary node, a next view of the current view; and
selecting a successor node that corresponds to the next view.

13. The computer-readable medium of claim 12 wherein switching the current view to the next view that uses the successor node as the succeeding blockchain primary node comprises:
switching the current view to the next view, wherein the successor node is used as a blockchain primary node in the next view.

14. The computer-readable medium of claim 8, wherein the blockchain network comprises a consortium blockchain network or a private blockchain network.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations for performing view switching in a blockchain network, wherein the blockchain network comprises a primary node and a plurality of backup nodes, wherein the primary node initiates a consensus for a service request within the blockchain network, and wherein the service request is not for initiating a view switching, the method comprising:
receiving, by the blockchain primary node, a trigger of a view switching condition in a blockchain network, wherein the trigger indicates one of:
(a) receiving the service request, initiating the consensus for the service request, and determining a result of the consensus for the service request, or
(b) a failure to initiate the consensus for the service request within a predetermined time;
selecting, by the blockchain primary node, a successor node from the plurality of backup nodes based on the trigger of the view switching condition; and
switching, by the blockchain primary node based on the successor node, a current view to a next view that uses the successor node as a succeeding blockchain primary node, wherein the succeeding blockchain primary node initiates a consensus in the next view.

16. The computer-implemented system of claim 15, wherein receiving the trigger of the view switching condition comprises:
- receiving, by the blockchain primary node, a service request; and
- determining that a consensus on the service request fails to be initiated within a predetermined time.

17. The computer-implemented system of claim 16, wherein determining that the consensus on the service request fails to be initiated with the predetermined time comprises: determining that the blockchain primary node sent an incorrect notification message indicating a consensus phase to the successor node.

18. The computer-implemented system of claim 16, wherein determining that the consensus on the service request fails to be initiated with the predetermined time comprises:
- determining that data included in the service request is incorrect.

* * * * *

UNITED STATES PATENT AND TRADEMARK OFFICE
CERTIFICATE OF CORRECTION

PATENT NO. : 10,684,925 B2
APPLICATION NO. : 16/440782
DATED : June 16, 2020
INVENTOR(S) : Qiang Tang Page 1 of 1

It is certified that error appears in the above-identified patent and that said Letters Patent is hereby corrected as shown below:

In the Claims

In Column 17, Line 51, Claim 8, delete "method" and insert -- operations --, therefor.

In Column 18, Line 51, Claim 15, delete "method" and insert -- operations --, therefor.

Signed and Sealed this
Eighth Day of September, 2020

Andrei Iancu
*Director of the United States Patent and Trademark Office*